(12) United States Patent
Hofmann et al.

(10) Patent No.: US 8,194,195 B2
(45) Date of Patent: Jun. 5, 2012

(54) DYNAMIC LIGHTING EFFECT SYSTEM

(75) Inventors: Bernd Hofmann, Aachen (DE); Rifat Ata Mustafa Hikmet, Eindhoven (NL); Hans Van Wijngaarde, Geldrop (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 355 days.

(21) Appl. No.: 12/093,726

(22) PCT Filed: Nov. 13, 2006

(86) PCT No.: PCT/IB2006/054212
§ 371 (c)(1),
(2), (4) Date: May 15, 2008

(87) PCT Pub. No.: WO2007/057830
PCT Pub. Date: May 24, 2007

(65) Prior Publication Data
US 2008/0284924 A1 Nov. 20, 2008

(30) Foreign Application Priority Data
Nov. 21, 2005 (EP) .................................... 05111002

(51) Int. Cl.
*G02F 1/1335* (2006.01)
*G02F 1/13* (2006.01)
*G02F 1/1347* (2006.01)

(52) U.S. Cl. ................................ 349/5; 349/74; 349/200

(58) Field of Classification Search .................. 349/200, 349/74–83, 15
See application file for complete search history.

(56) References Cited

U.S. PATENT DOCUMENTS

| 5,235,446 A * | 8/1993 | Majima .............................. 349/8 |
| 2001/0055145 A1* | 12/2001 | Hamada .......................... 359/290 |
| 2003/0035290 A1 | 2/2003 | Bornhorst |
| 2004/0141120 A1 | 7/2004 | Faris et al. |
| 2004/0246225 A1* | 12/2004 | Mukawa et al. .............. 345/102 |
| 2005/0047134 A1 | 3/2005 | Mueller et al. |
| 2005/0195339 A1* | 9/2005 | Saitoh et al. .................... 349/61 |

FOREIGN PATENT DOCUMENTS

| EP | 0676902 A2 | 10/1995 |
| GB | 2284101 A | 5/1995 |
| GB | 2408620 A | 6/2005 |
| WO | WO2004085919 A1 | 10/2004 |
| WO | WO2005004551 A1 | 1/2005 |

* cited by examiner

*Primary Examiner* — Mark Robinson
*Assistant Examiner* — Michael Inadomi
(74) *Attorney, Agent, or Firm* — John F. Salazar; Mark L. Beloborodov

(57) ABSTRACT

Lighting systems, in particular used for SSTV, disco lights, lighting consoles and claviluxes. In order to reduce noise and to increase robustness, the system comprises a light beam source (6) arranged for generating a beam of light, a projection gate (8) arranged for controlling the beam of light, wherein the light beam source (6) is comprised of at least one light emitting diode, and the projection gate (8) comprises at least one liquid crystal (LC) optical element.

1 Claim, 8 Drawing Sheets

Figure 5:
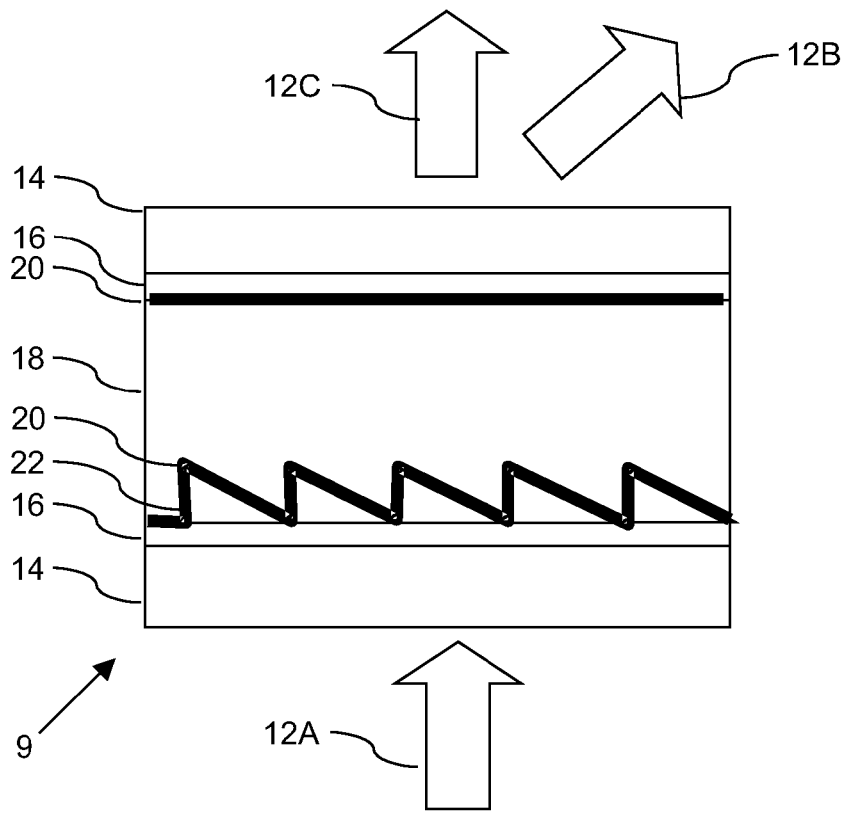

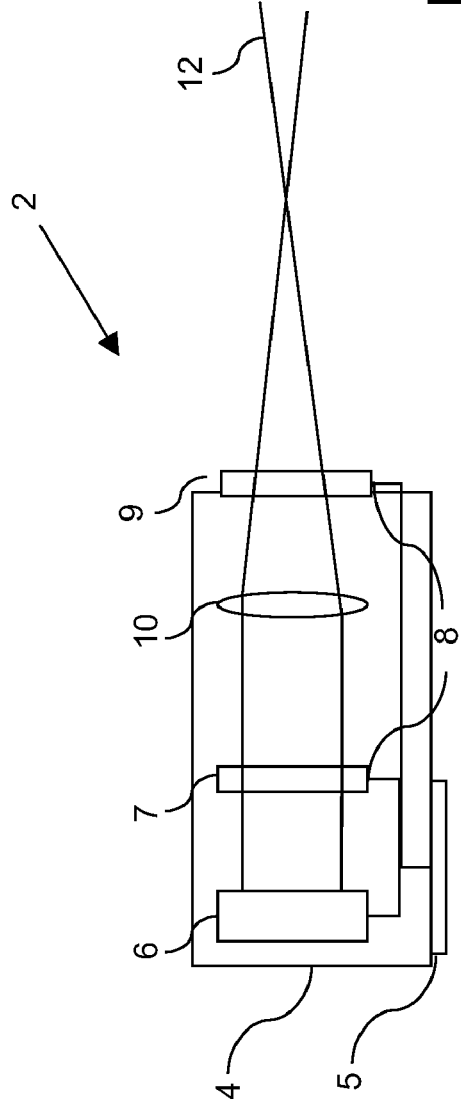
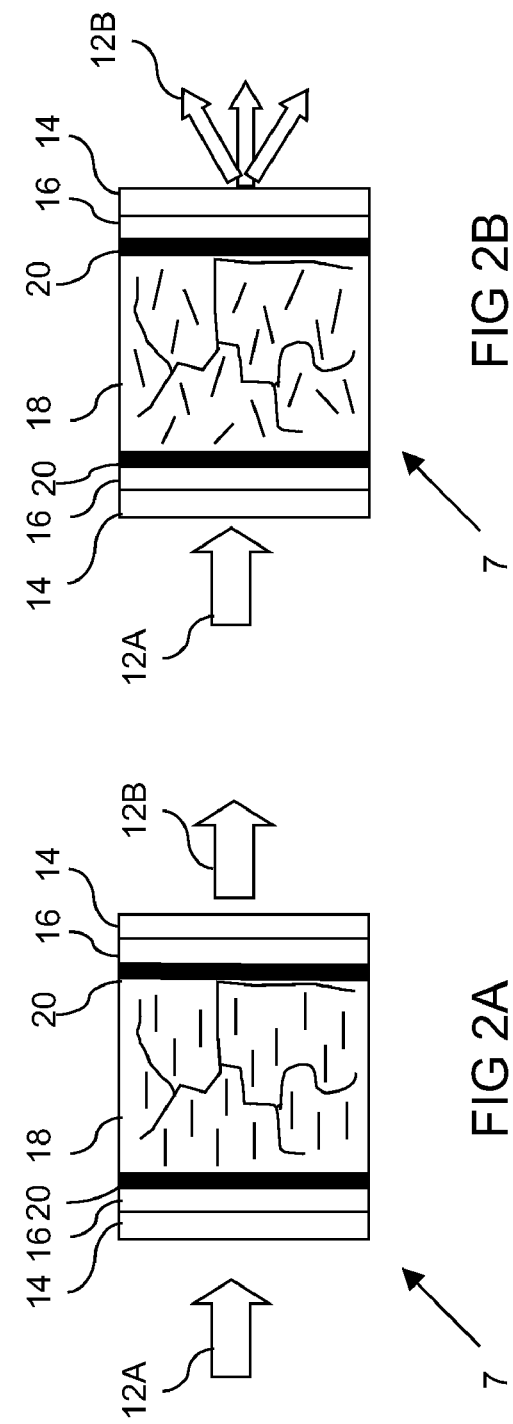
FIG 1
FIG 2A
FIG 2B

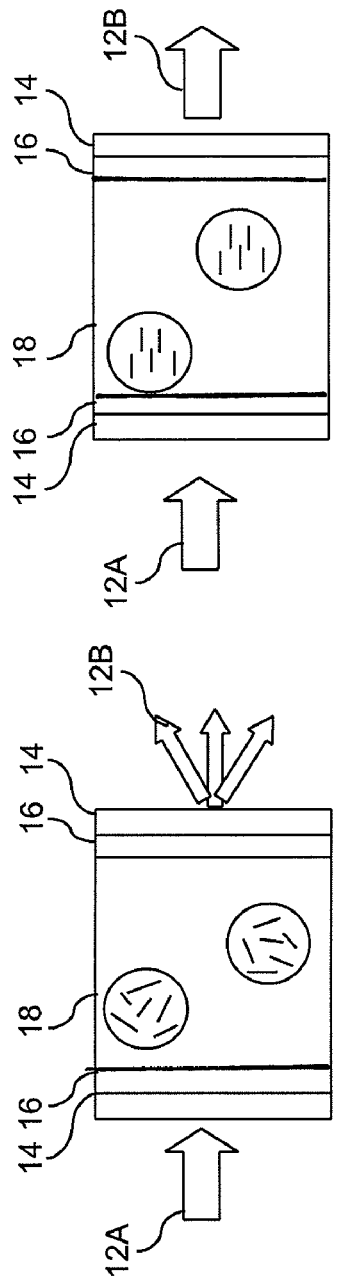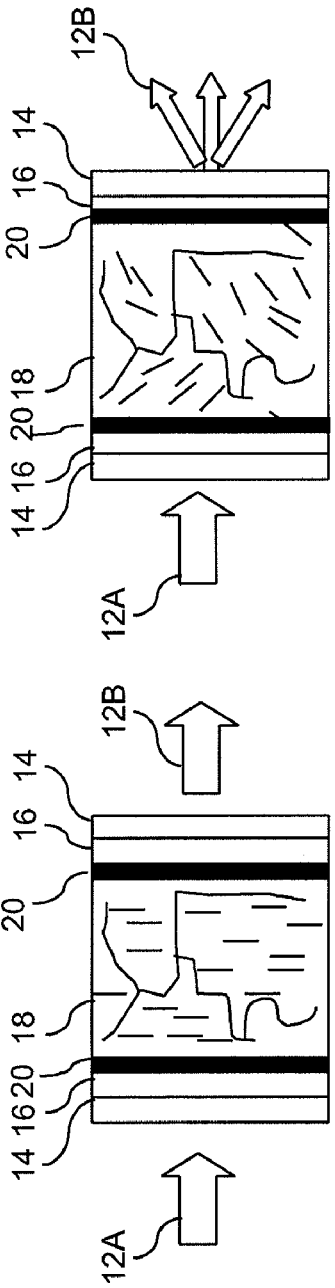

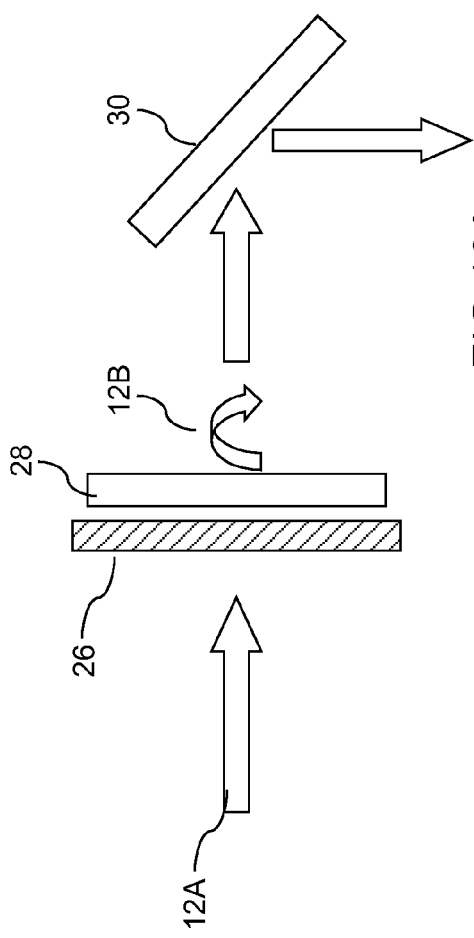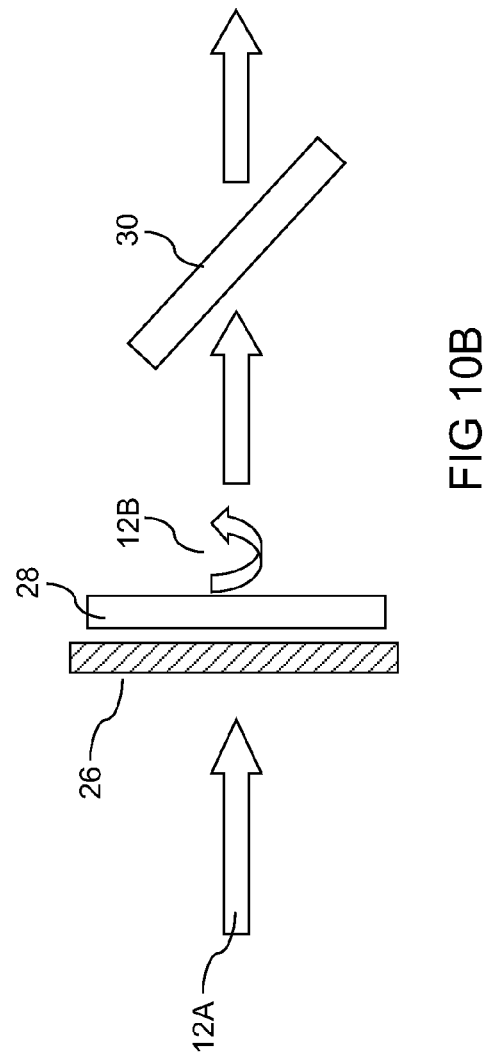

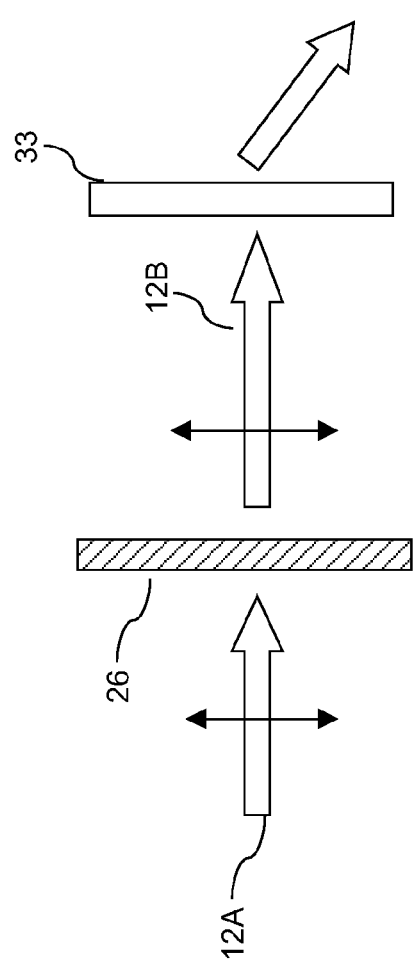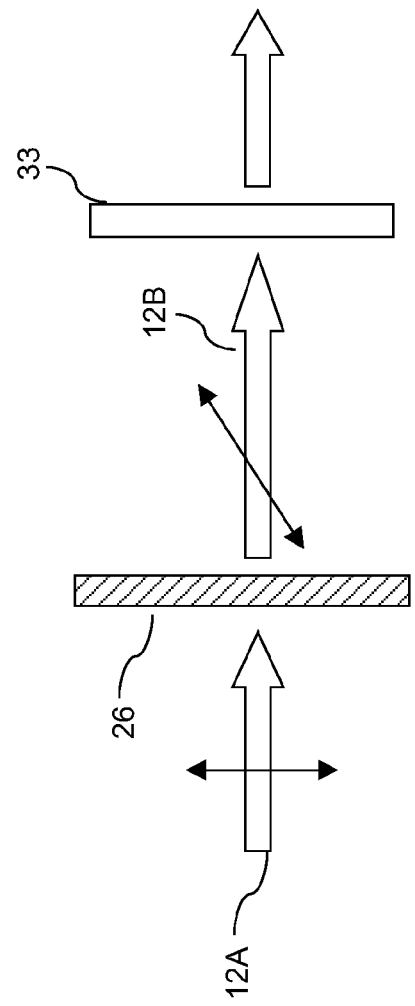

DYNAMIC LIGHTING EFFECT SYSTEM

The application relates to lighting systems, in particular used for SSTV, disco lights, lighting consoles and claviluxes.

In recent years, lighting projectors for Stage, Studio, and Television (SSTV) architectural, and entertainment applications were required to provide a variety of different lighting effects. These lighting effects may, for examples, provide varying the light beam angle, changing the light beam shape, creating simple images, creating moving images, changing the direction of light, and providing colour effects, as well as further other effects.

Lighting projectors as known in the art facilitate halogen lights, such as high intensity discharge (HID) lamps. HID Lamps as used in current applications form a beam of a high intensity light, and consume up-to and even more than 1000 Watts.

Light forming elements used with these HID lamps have to endure high temperatures. In particular, liquid crystal and polymer composites used as projection gates are temperature sensitive. In order to reduce the absorbed infra-red component of the emitted light, US 2003/0035290A1 proposes a temperature control by means of a liquid filter cell. Further, a temperature absorbing mirror is proposed. However, these elements have the drawback of increasing the complexity of the lighting system. Further, the more components are part of the system, the more errors may occur within the system. A failure of the temperature control will inevitably lead to destruction of the projection gate.

Further, in order to obtain colour control, the use of various filter assemblies and their movement is suggested. This leads to increased mechanical complexity of such a system. In addition, US 2003/0035290A1 does not provide any solution for moving the direction of the beam, which is often necessary in GOBO projectors.

Therefore, it is one object of the application to provide a lighting system with reduced UV and IR emission, to protect active optical elements. It is further an object of the application to produce colour effects based on non-mechanical means. It is also an object of the application to produce beam deflection based on non-mechanical means. Another object of the application is to provide imaging and beam controlling by means of low complexity mechanics.

These and other objects are solved by an optical system for creating dynamic light effects, in particular in SSTV applications, comprising a light beam source arranged for generating a beam of light, a projection gate arranged for controlling the beam of light, wherein the light beam source is comprised of at least one light emitting diode, and the projection gate comprises at least one liquid crystal (LC) optical element.

The projection gate may comprise means for imaging by controlling the light so that the projected image has local intensity variation. Further, beam shaping and directing means may be comprised in the projection gate. The beam shaping means may be arranged for controlling the direction, shape, form, and splitting of the beam of light. The imaging means may be formed for controlling the intensity and contrast of the beam of light, but do not constitute beam shaping. The imaging means and beam shaping means may be selectively combined within the projection gate. The means may be spatially arranged apart from each other. The imaging means is preferably arranged in the focal length of the projection and the beam shaping means is preferably arranged close to a lens (before or after the lens) of the optical system. Both means may be constituted by LC elements.

The system is comprised of liquid crystal (LC) elements and a light source made from at least one light emitting diode (LED). The LED may emit light such as a high intensity discharge lamp. However, LED emitted light has a narrow spectrum and it does not contain any infrared (IR) or ultra violet (UV) component. This has a great advantage as IR and UV radiation is usually absorbed by active optical components, such as LC elements, which are placed in the path of the light beam. This results in excess heating of these components.

Another aspect of the application is a light projector comprising a system as previously describes.

Figure 6:
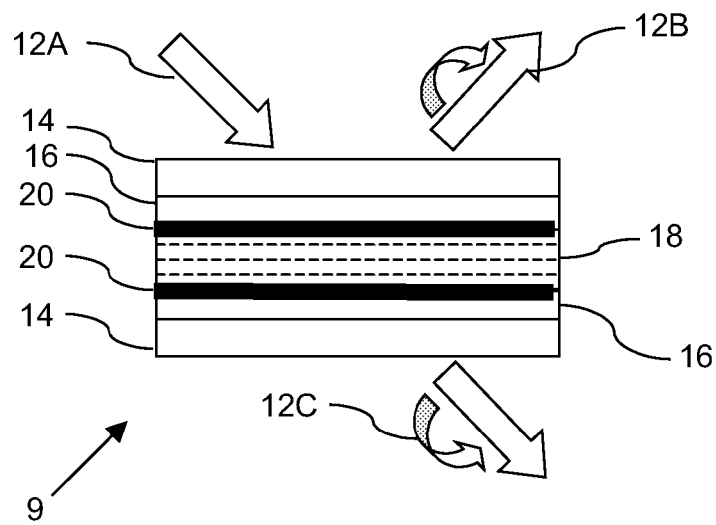
Figure 7A:
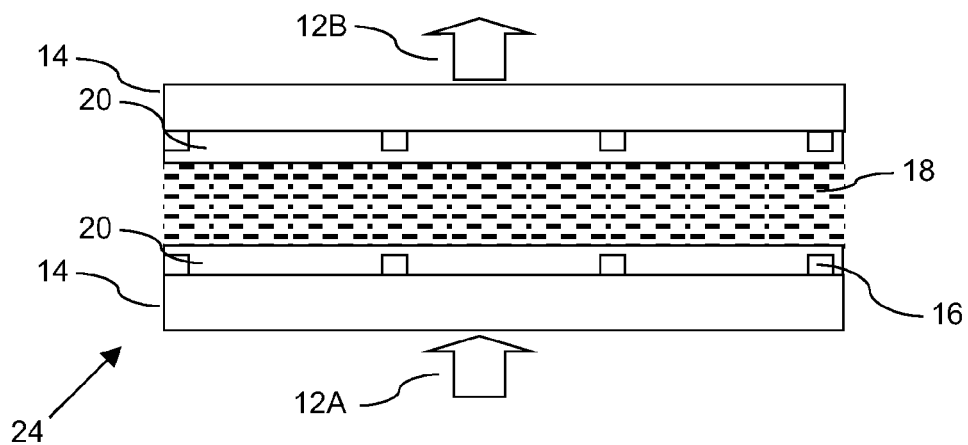
Figure 7B:
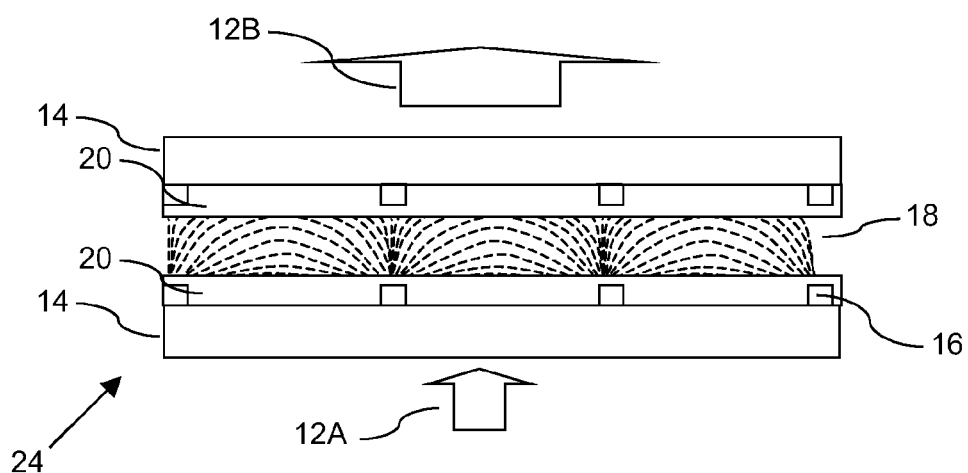
Figure 9B:
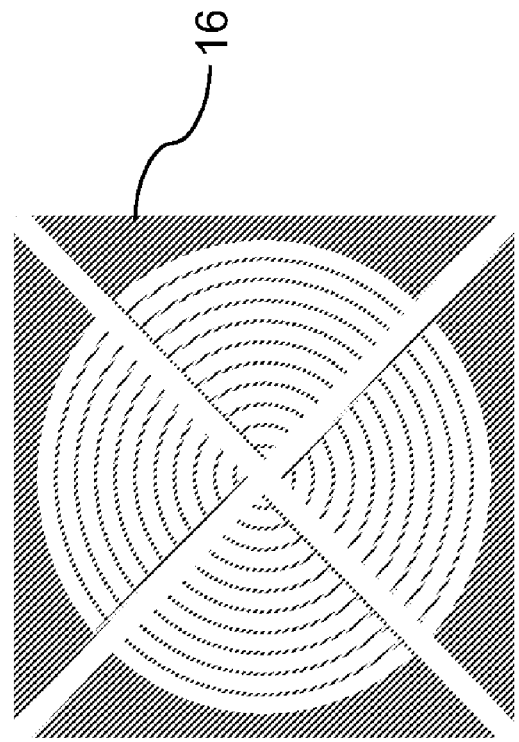
Figure 9A:
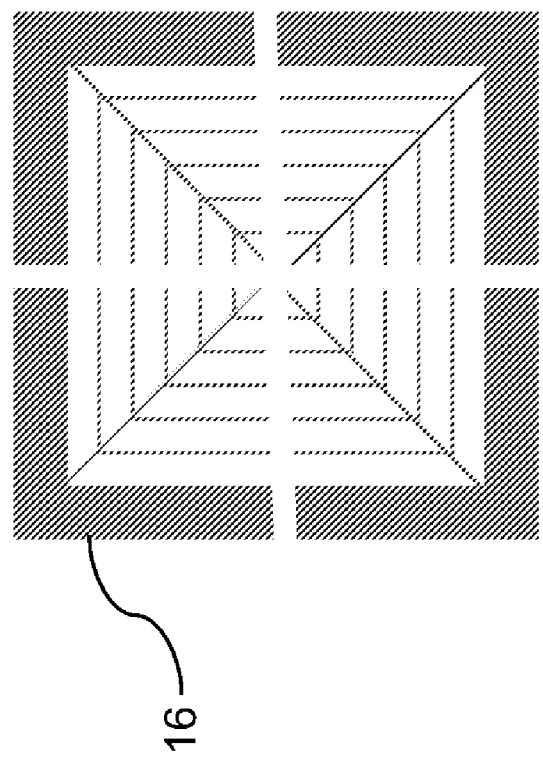

These and other aspects of the application will become apparent from and elucidated with reference to the following figures. In the figures show:

FIG. 1: a light projecting system according to embodiments;

FIG. 2A-B: illustrates a projection gate according to a first embodiment;

FIG. 3A-B: illustrates a projection gate according to a second embodiment;

FIG. 4A-B: illustrates a projection gate according to a third embodiment;

FIG. 5: illustrates a projection gate according to a fourth embodiment;

FIG. 6: illustrates a projection gate according to a fifth embodiment;

FIG. 7A-B: illustrates a GRIN element according to a first embodiment;

FIG. 8A-D: illustrated various arrangements of electrode patterns;

FIG. 9A-B: illustrated further arrangements of electrode patterns;

FIG. 10A-B: illustrates an embodiment with a polarizing beam splitter;

FIG. 11A-B: illustrates another embodiment with a polarizing beam splitter.

FIG. 1 illustrates a system 2 for providing lighting effects according to embodiments. The system 2 is comprised of a housing 4, a number of LEDs 6, a projection gate 8 and lenses 10. Illustrated is the projection gate 8 as a combination of imaging means 7 and beam shaping means 9. The projection gate 8 may comprise these means arranged spatially apart from each other as well as integrated within one group of means. The positioning of the elements 4-10 is just an example and may vary depending on the application needs. The LEDs 6 produce a light beam 12, which is projected through the projecting gate 8 and the lenses 10. As illustrated, the imaging means 7 are arranged in front of the lens 10. Preferably, the imaging means are arranged in the focal length of the projection. The beam shaping means 9 are arranged behind the lens 10, but may also be arranged in front of the lens 10.

Both the imaging means 7 and the beam forming means 9 comprise LC elements for providing altering of the beam of light.

It is possible, that a triple of three LEDs form one lighting element 6. Within this triple, one LED emits green light, one LED emits red light, and one LED emits blue light. By controlling each of the LEDs within this triple, any colour can be created and colour effects are possible without using colour filters.

An electronic control unit 5 can be used for controlling the lighting element 6, the imaging means 7, and the beam forming means 9. The electronic control unit 5 can control the intensities of LEDs in the lighting element 6 to create to various colours and dynamic effects. The electronic control unit 5 can apply voltages to the electrodes in the projection gate 8 for producing dynamic lighting effects. It can control the beam forming means 9 for forming the shape and direction of the beam of light. It can further control the imaging means 7 for creating different light intensities, for scattering the light and for creating images.

The imaging means 7 and the beam shaping means 9 of the projection gate 8 can comprise a matrix of liquid crystal LC elements, each of the elements may represent one pixel element of a projected image. The LC elements can be controlled via a control interface. Using a control interface, an automated control of the LC elements is possible.

By controlling the LC elements used for the imaging means 7, light can be transmitted to the outside of the housing 4, reflected back into the housing 4, scattered and refracted. Light, which is not collected by the projection lens 10, will not be projected. In this way images with a certain contrast can be produced.

The beam shaping means 9 can be placed before or after the projection lens 10 and it can be used for controlling the shape and/or direction of the beam. The structure of LC elements which can be used for imaging means 7 and beam shaping means 9 is illustrated within the following figures.

FIGS. 2A and 2B illustrate an imaging means 7 with optical elements. Illustrated are transparent plates 14, transparent electrodes 16 and liquid crystal gel 18. The transparent plates can be made from a carrying substrate, carrying the electrodes 16. The substrate can, for example, be a glass substrate. The application of an electric field can influence the orientation of the liquid crystal molecules within the gel 18.

For example, as shown in FIG. 2A, liquid crystal molecules of the gel 18 are oriented perpendicular to the glass plates along the direction of the light beam 12 using orientation layers 20. The liquid crystal gel 18 may be formed to be transparent is this state. For example, the liquid crystal 18 in FIG. 2A may be formed to be oriented parallel to the direction of the light beam in case the voltage between the electrodes 16 is zero. As illustrated, the incoming light beam 12A is guided through the liquid crystal 18 and exits the imaging means 7 without being scattered. The liquid crystal gel 18 may be comprised of polymer and liquid crystal molecules.

The orientation layers 20 can comprise polymers, surfactant molecules or evaporated oxides which can induce various orientations on liquid crystal molecules brought on top of them. Uniaxial planar orientation is often obtained when such layers are buffed with a cloth as often used in the liquid crystal display industry. In the case of so-called photo alignment, the layer 20 is exposed to polarized light, which is used in order align the polarization of the light with the liquid crystal molecules. Polymide is one of the polymers frequently used as the orientation layer.

In case a voltage is applied between the electrodes 16, the liquid crystal gel 18 gets scattered and the light beam 12 is scattered, as illustrated in FIG. 2B. When the voltage across the transparent electrodes 16 present on substrates 14 is zero, the liquid crystal 18 is transparent, and, when a sufficiently high voltage is applied across the electrodes 16, the incoming light 12A becomes scattered 12B. The elements illustrated in FIG. 2A and FIG. 2B may be pixellated elements, each pixel representing one pixel of an image to be produced by the imaging means 7.

FIG. 3A and FIG. 3B illustrate imaging means 7, which work opposite to the imaging means 7 illustrated in FIG. 2A and FIG. 2B. When a zero Volt signal is supplied to transparent electrodes 16 present on substrates 14, the incoming light 12A is scattered, and, when a sufficiently high voltage is supplied, the liquid crystal 18 becomes transparent and the light beam 12B exits the projection gate 8.

The liquid crystal gel 18 shown in FIG. 3A and FIG. 3B can be used for anisotropic scattering where the light is scattered in one direction. In that case, as illustrated in FIG. 4A and FIG. 4B, the initial orientation of the liquid crystal 18 molecules are oriented parallel to the electrodes 16 as induced by orientation layers 20. In case there is no voltage applied between the electrodes 14, the imaging means 7 is transparent. Application of an electric field between the electrodes 14 introduces scattering due the formation of domains in the cell due to the presence of a polymer.

The above described LC elements may be used as embodiments of imaging means, but may also be used for beam control in beam shaping means 9. The projection gate may comprise a light reflecting element. The light reflection element can be a cholesteric element or a switchable cholesteric element, or a linear polarised light-reflecting element. The beam shaping means can provide beam deflecting. The beam deflecting may be caused by a grating structure, or switchable elements. The projection gate may also comprise a switchable wave plate element, or a switchable GRIN element.

FIG. 5 illustrates an embodiment of beam shaping means 9. In FIG. 5, beam shaping means 9 is illustrated with transparent plates 14, electrodes 16, and liquid crystal 18. The electrodes 16 are coated with orientation layers 20. Further illustrated is a blazed grating structure 22 which can be made of an isotropic, having a single refractive index, or birefringent which is macroscopically oriented with more than one refractive index anisotropic material. Depending on the orientation of the molecules, light will be refracted in a certain direction. The effective refractive index of the grating structure 22 can be altered by applying a voltage between the electrodes 16 or not. Depending on the refraction index of the grating structure 22, the incoming light beam 12A is refracted to an angle 12B, or remain the same 12BC. Upon application of an electric field between the electrodes 16, the orientation of the liquid crystal 18 molecules can be altered from their initial orientation as induced by the orientation layers 20.

As in the configuration shown in FIG. 5 applying an electric field will influence only one of the effective refractive index of the molecules. Therefore, only one of the polarisation directions will be effected. If both polarization directions need to be effected, two of such elements need to be used in a configuration where the orientations of liquid crystal molecules in the elements are orthogonal to each other. The orientation direction of the molecules can be kept the same, however, in that case a polarisation rotator, such as a half wave plate, needs to be inserted between the elements.

In order to selectively change the light beam direction, a switchable reflector can be used. This reflector may, for example, comprise so called chiral liquid crystalline structures, as illustrated in FIG. 6.

FIG. 6 illustrates beam shaping means 9 with transparent plates 14, electrodes 16, and liquid crystal 18. The electrodes 16 are laminated with orientation layers 20. The orientation layers 20 define the orientation of the liquid crystal 18 molecules. Chiral liquid crystal molecules have the property to reflect a band of circularly polarized light 12B and let pass a band of circularly polarized light 12C with the opposite sense. The position of the reflection band is a property determined by the amount of so-called chiral molecules present in the chiral liquid crystal mixture.

For providing selectively directing a certain color, a voltage across the transparent electrodes 16 is applied, which removes a helical structure of the liquid crystal 18 and makes the cell transparent. In order to reflect both polarization directions a double cell configuration can be used. In this configuration one of the possibilities is to use cells containing chiral materials reflecting left and right polarization directions of circular polarized light. The other possibility is to use cells, which reflect the same circular polarisation sense with a half wave plate in between.

In order to influence the shape and size of beam of light 12, a liquid crystalline refractive index gradient (GRIN) element or array as shown in FIG. 7A and FIG. 7B is proposed. Such an element can be part of the projection gate 8. Illustrated in FIG. 7A and FIG. 7B is a GRIN element 24 comprising transparent plates 14, transparent electrodes 16 and liquid crystal 18. The macroscopic orientation of the liquid crystal 18 molecules is induced with the orientation layers 20, which can be made of rubbed polymer layers.

The gist of the GRIN element lies in the patterned electrodes 16. The electrodes 16 are not distributed evenly over the whole surface, but represent a pattern. In the illustrated case, the electrodes 16 are aligned to each other and form parallel bars. The arrangement of electrodes 16 allows broadening the beam as well as tilting it.

As illustrated, both surfaces of the transparent plates 14 contain patterned electrodes 16, where the electrodes 16 are aligned with respect to one another so that the patterns show almost perfect overlap.

FIG. 7A illustrates the field lines of an electric field when no voltage is applied to the electrodes 16. In this case, the light beam 12A is directed evenly through the GRIN element 24.

When applying an electric field between the electrodes 16, as illustrated in FIG. 7B, the potential is highest directly between the electrodes. Field lines leak outside the electrodes 16, resulting in their non-uniformity. As a result, a refractive index gradient of the liquid crystal 18 is formed in the area containing no electrodes. If the transparent electrodes contain line electrodes at a periodic distance, as illustrated in FIG. 7A and FIG. 7B, cylindrical lenses can be induced.

When the applied voltage across the electrodes is zero, the liquid crystal molecules are oriented uni-axially and there is no lens working present within the GRIN element 24, as shown in the FIG. 7A, and the beam 12A passes through the cell without being altered. Application of an electric field across the electrodes 16, as shown in FIG. 7B results in a refractive index gradient being induced in the region between the electrodes 16 and the path of the light beam 12 is altered. The cylindrical lens as illustrated in FIG. 7B can be used for beam broadening.

Patterned electrodes as illustrated in FIG. 7A and FIG. 7B can have any structure, various examples of which are shown in FIG. 8A-D. By defining the pattern of the electrodes, different beam forming is possible.

Figure 8C:
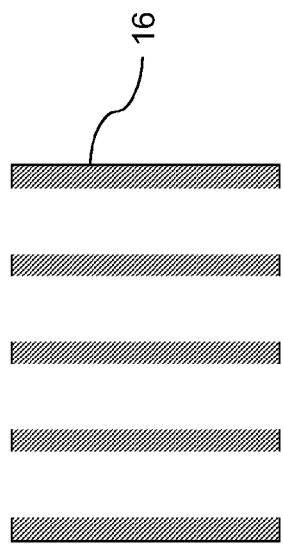
Figure 8D:
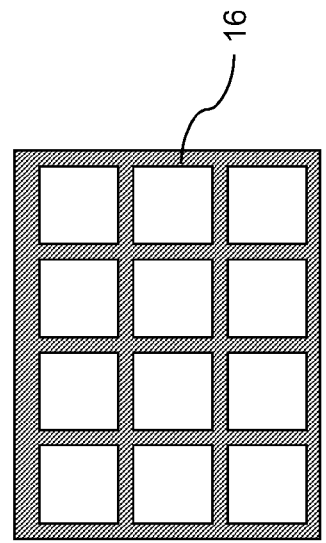
Figure 8A:
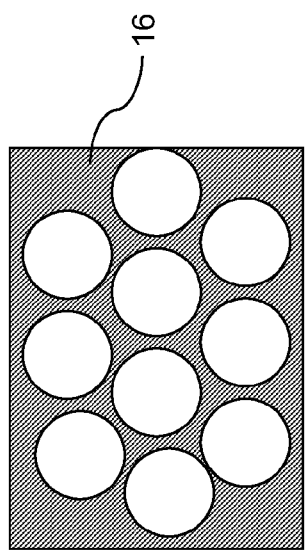
Figure 8B:
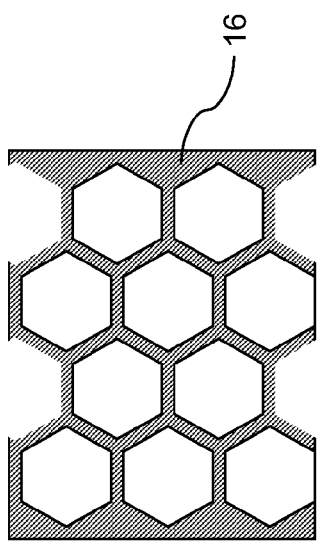

FIG. 8A illustrates a top view of a pattern where the electrodes 16 have circular holes. FIG. 8B illustrates top view of a pattern where the electrodes 16 have hexal holes. FIG. 8C illustrates a top view of a pattern where the electrodes are aligned in lines, which corresponds to the pattern illustrated in FIG. 7A and FIG. 7B. In FIG. 8D the pattern of the electrodes 16 is a grid.

It is not necessary that the pattern of electrodes is uniform over the whole surface. For example FIGS. 9A-B show electrodes 16, where different segments can also have different patterns.

It is not necessary that both electrodes 16 have the same pattern. According to embodiments the GRIN element 24 can be produced where only on one of the surfaces an electrode pattern is provided and the other surface does not contain any pattern. In yet another embodiment the patterned electrode(s) can be covered by a layer with a very high surface resistance in the range Mega Ohm/square.

The GRIN element 24 described above show polarization dependence as only one of the effective refractive indices is altered by the applied electric field. If both polarization directions need to be effected, two of such elements need to be used in a configuration where the orientations of the liquid crystal molecules in the elements are orthogonal to each other. In both elements the orientation direction of the molecules can be kept the same however in that case a half wave plate needs to be inserted between the elements.

The GRIN element 24 can be used for a single pixel or a plurality of pixels. In such a pixelated cell, various beam shapes can be produced.

The components described in principle work for unpolarized light. If the light from the source is converted into polarised light using the methods known in the field such as polarising beam splitters, it is possible to provide switchable components and effects as will be illustrated in FIG. 10A and FIG. 10B.

For example, a projection gate 8 can contain elements with liquid crystals 18 arranged to rotate the polarisation direction of linearly polarised light by 90 degrees. Such elements can be twisted nematic, half wave ferroelectric or nematic. When such an element is combined with a quarter wave plate, light can be switched between a left circularly polarized state and right circularly polarized state. When it is combined with a switchable quarter wave plate, the light can be switched between four states (left circularly polarised (LCP), right circularly polarised (RCP), horizontal linear polarised (HLP), vertical linear polarised (VLP)).

Polarising optical elements can be placed in the path of the beam of light to create various effects, such as deflection of light, or reflection of light depending on the state of polarisation of light.

FIG. 10A and FIG. 10B illustrates an example of a beam shaping means 9 with a switchable polarisation rotator 26, a quarter wave plate 28 and a cholesteric reflector 30. In this example the light beam 12 may be linearly polarised light.

In operation, as illustrated in FIG. 10A, a linearly polarised light beam 12A passes through a polarisation rotator 26 and then quarter wave plate 28. In quarter wave plate 28 the light beam 12A becomes circularly polarised light beam 12B. The circular polarisation of the light beam 12B may have the same sense as the cholesteric reflector 30. Thus, the light beam 12B becomes reflected.

In examples illustrated in FIG. 10A and FIG. 10B a cholesteric reflector is used. There are also reflectors reflecting linear polarised light. In that case use of quarter wave plate is not needed.

Polarisation rotator 26 can be arranged with liquid crystals 18 arranged to rotate the polarisation direction of linearly polarised light by 90 degrees. Such elements can be twisted nematic, half wave ferroelectric or nematic. When the polarisation filter is activated by an applied electric field, as illustrated in FIG. 10B, the light beam 12B assumes the opposite circular polarization and is transmitted through cholesteric reflector 30.

In FIG. 11A and FIG. 11B another example is shown where a polarizing beam splitter is used. Such a polarizing beam splitter can be a structure containing isotropic and birefringent layers. Linearly polarized light beam 12A goes through the polarization rotator 26 and becomes deflected by the polarizing beam splitter 33. When the polarization rotator 26 is activated the polarization direction becomes 90 degrees rotated and the light beam 12B goes through the polarizing beam splitter 33 without becoming deflected.

The LC effects described above for the projection gate are created by the application of an electric field. Therefore, the electronic control unit 5 may be used for applying voltages for the creation of dynamic effects in the desired sequence. Furthermore, these effects can be coupled to the intensity control unit for LEDs so that colour, intensity, image, and beam shape effects can be produced in a desired way.

While there have been shown and described and pointed out fundamental novel features of the invention as applied to a preferred embodiment thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. It should also be recognised that any reference signs shall not be constructed as limiting the scope of the claims.

The invention claimed is:

1. An optical system for creating dynamic light effects comprising
    a light beam source arranged for generating a beam of light,
    a projection gate arranged for controlling the beam of light, wherein said light beam source has at least one light emitting diode, and said projection gate has an imaging optical element and a liquid crystalline refractive index gradient element as a beam forming optical element;
    said imaging optical element having a liquid crystal optical element, said liquid crystal optical element positioned between a first and a second transparent plate;
    a first and a second transparent electrode positioned on either side of said liquid crystal optical element to selectively energize and orient said liquid crystal optical element;
    a first and a second orientation layer directly adjacent said liquid crystal optical element which can orient liquid crystal molecules in said liquid crystal optical element;
    wherein said liquid crystalline refractive index gradient element includes a first and a second transparent plate;
    a first and a second rubbed polymer layer positioned adjacent respective said first and second transparent plate, each of said first and said second rubbed polymer layer enclosing respective first and second patterned electrodes which form parallel;
    wherein said first and second patterned electrodes are aligned with respect to one another and are line electrodes at a periodic distance thereby inducing cylindrical lenses;
    wherein said first and second patterned electrodes are operable when a voltage is applied to create a refractive index gradient of a liquid crystal layer positioned between said first and said second rubbed polymer layer being formed in an area containing no electrodes in said first and second patterned electrode layer.

* * * * *